United States Patent Office

2,955,997
Patented Oct. 11, 1960

2,955,997

IRRADIATION METHOD OF CONVERTING ORGANIC COMPOUNDS

Augustine O. Allen, Shoreham, and James M. Caffrey, Jr., Beacon, N.Y., assignors to the United States of America as represented by the United States Atomic Energy Commission Filed July 15, 1957, Ser. No. 672,102

5 Claims. (Cl. 204—162)

The present invention relates to a method of controlling the distribution of products formed by the irradiation of organic compounds, and more particularly to changing this distribution from that found when these organic compounds are irradiated in bulk.

Radiolysis of bulk liquid hydrocarbons and other organic compounds has been reported in the literature. For example, radiolysis of bulk liquid pentane has been investigated. In these investigations one unit which is employed in reporting the results is a so-called "G" which is a measure of the amount of chemical change which has taken place as a result of the absorption of 100 electron volts of incident energy. The study of the bulk liquid pentane irradiation revealed that hydrogen is formed with a $G_{H_2}$ of approximately 4.2, that methane is formed with a $G_{CH_4}$ of approximately 0.36 and that other hydrocarbons with molecular weights higher and lower than pentane are formed in very small concentrations. A similar array of products results from irradiation of other alkanes.

Certain of the products formed by bulk liquid radiation of organic compounds are more desirable than others. For example, for some purposes it is desirable to have low molecular weight gaseous products formed by radiolysis, in other cases higher molecular weight materials are desired. With regard to hydrocarbons, the fuel properties of these substances are enhanced as the extent of branching of the aliphatic components is increased.

With further regard to the production of gaseous radiolysis products, it has been found that irradiation of straight chain or cyclic hydrocarbons in bulk, invariably resulted in the production of a gas in which the ratio of hydrogen gas to methane gas was very high. Hydrogen is, in fact, a very prominent product in every radiolysis of any hydrogen-containing organic compound that has been reported in the literature.

One of the objects of the invention is to change the ratios in which the various chemical products of radiation are formed as compared to the ratios in which they are formed by bulk irradiation. Another object is to control the molecular weight and isomeric distribution of products formed by radiolysis. A further object is to decrease the extent of degradation of organic compounds resulting from the radiation thereof. A further object is to increase the relative quantity of branched hydrocarbons produced by the irradiation of straight chain hydrocarbons. Still another object is to increase the extent of chemical change of an organic compound due to the absorption of ionizing radiation. Another object is to increase the yield of high molecular weight hydrocarbons in a hydrocarbon composition subjected to irradiation. Another object is to increase the amount of chemical change which occurs from absorption in an organic compound of a unit of energy from penetrating radiation. Other objects will be in part apparent and in part pointed out hereinafter.

For the purposes of this application penetrating radiation will be understood to include particulate and electromagnetic radiation capable of penetrating and at least partially passing through the materials treated. Neutrons at thermal energies and above, particle beams and X-rays as produced in high energy electrical devices, and radiation from radioactive sources are included in this term.

In describing the irradiation of substances in accordance with the subject method one unit of dose which is employed is the rad. The rad is the amount of energy taken up by a unit quantity of material irradiated. One rad is equal to 100 ergs of energy taken up by one gram of material irradiated.

The manner in which the invention is practiced and the advantages resulting from its practice are described and illustrated below with reference to the accompanying figures in which.

As noted above as a result of irradiation of organic materials at relatively high doses of the order of 100,000 rads or more, certain radiolysis products are formed when this material is in bulk form. For example, hydrogen, methane and other radiolysis products are formed as a result of the irradiation of hydrocarbons and these products are formed in certain well-defined ratios to each other and to the quantity of organic compound irradiated. Effectively the subject method is useful in changing these ratios for a given irradiation dose.

For example, in accordance with the subject method the ratio of the quantity of hydrogen produced to the quantity of some other radiolysis product or to the quantity of starting material may be increased or decreased. Correspondingly the percentage of the starting material which is lysed to form methane may be increased or decreased. The actual quantity of radiation products produced is not materially changed from the quantity produced by irradiation of bulk organic materials. Rather it is the chemical identity of the radiolysis products and the ratios in which they are produced, by comparison to bulk irradiation, which are significantly changed.

In accordance with one of the broader aspects of the subject invention the objects thereof are achieved by forming a layer of an organic compound to be irradiated on the surface of a solid substance having a surface area greater than one square meter per gram, said substance being unreactive with and insoluble in the organic substance irradiated, subjecting the substance of the layer to irradiation, and separating the organic material and products formed from the solid.

In one of its narrower aspects the objects of the invention are achieved by disposing a thin layer of the order of one monolayer of a hydrocarbon having an appreciable portion of straight chain carbon linkages on the surface of a solid substance with which the hydrocarbon is unreactive and which does not dissolve the solid, the surface of the solid having an area in excess of one square meter per gram and being capable of transferring energy to the hydrocarbon on irradiation with X-rays or gamma rays, irradiating the composition and separating the hydrocarbons from the solid and from each other.

One of the principal advantages achieved in the practice of the subject invention is a transfer of energy from the surface of the solid substance to the organic compound thereon. While the mechanism of this phenomenon is not clearly understood it is thought to be responsible for the modification of ratios in which products of radiolysis are formed as compared with the ratios in which they are formed as a result of bulk irradiation.

of the same organic compound with the same radiation dosage.

Figure 3:
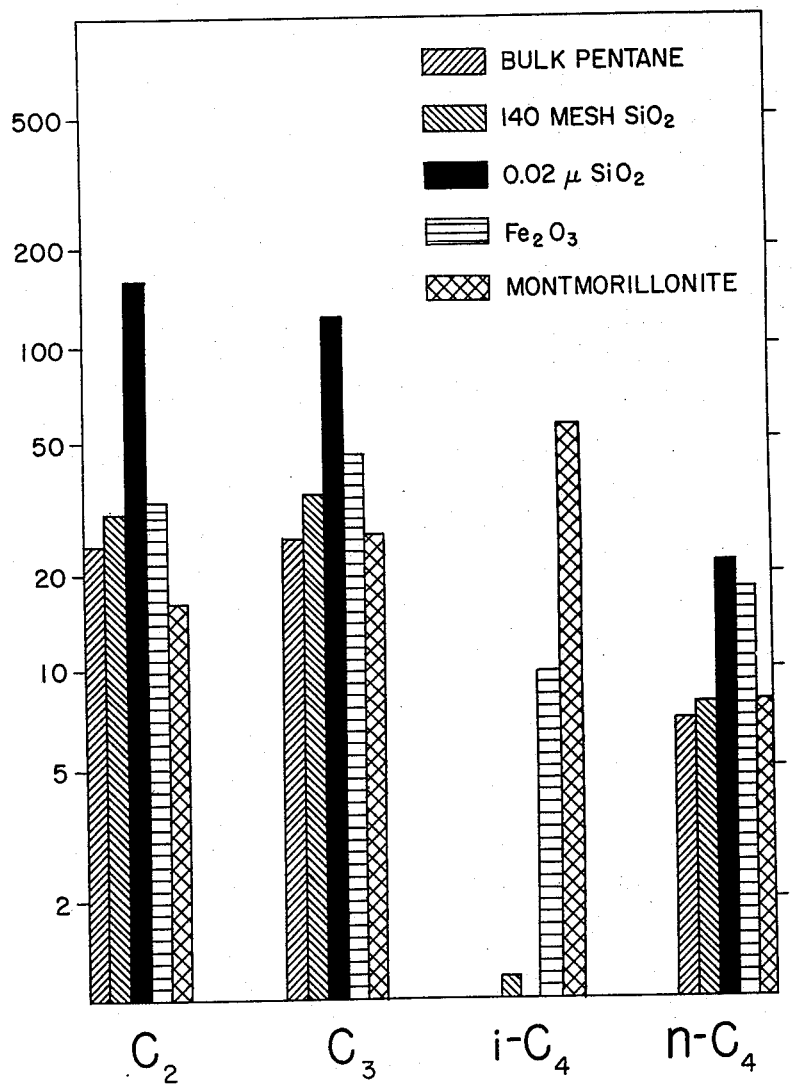
Figure 3 is a bar graph of the yields of hydrocarbon radiolysis products relative to isopentane.

The irradiation of hydrocarbons, particularly the aliphatic hydrocarbons has been found to produce branched hydrocarbon products. The production of branching is important in that it improves the fuel properties of the hydrocarbons. Thus it has been demonstrated that very significant increases in the percentage of a branched hydrocarbon in the radiolysis products can be attained by irradiation of an aliphatic hydrocarbon coated on a finely divided or high surface area solid over the percentage which can be produced by bulk radiolysis of the same aliphatic hydrocarbon. In addition with regard to the irradiation of an aliphatic hydrocarbon such as normal pentane, the quantity of volatile radiolysis products is increased over that percentage for the irradiation of n-pentane in bulk form. The extent of the modification of the percentages in which the various radiolysis products are formed in contact with a number of solids is illustrated in Figure 3 which is a bar graph of the relative concentrations of the radiolysis products formed in layers disposed on the solids specified.

Where irradiation is employed to produce radiolysis products it is important that the desired products be produced in relatively high concentration as compared to other radiolysis products which are formed simultaneously. In accordance with the methods of the subject invention a control of the relative distribution of these products is accomplished by appropriate selection of the solid material on which the layer of the organic substance is to be disposed during irradiation and by control of the thickness of the layer of this organic material. The solid material is selected both according to its chemical composition and to its state of subdivision or surface area. A surface area in excess of one square meter per gram is needed to produce a significant alteration in the distribution of radiolysis products. Generally increased surface area gives an increased effect for a particular solid substance.

One method of disposing an organic substance to be irradiated onto a solid having a large surface area is by adsorption from the vapor state. Radiolysis products of higher volatility than that of the substance deposited may be removed from the surface of the solid as the irradiation proceeds based on the difference in volatility as for example by passing a sweep gas through a bed of the solid on which the organic substance is deposited as this bed is irradiated in a radiation zone.

An alternative method of introducing organic substances onto and removing radiolysis products from the surface of a solid substance comprises dissolving the organic substance in a solvent which does not attack the solid suspending medium and evaporating the solvent to leave a layer of the organic substance coated on the solid. A second solvent capable of selectively dissolving and removing radiolysis products of the deposited organic substance may be employed to concentrate and remove such products from a radiation zone.

In general, the solid substance on which the organic material is deposited should be insoluble in both the organic substance and the solvent which may be used with it, and it should be unreactive with both. Substances having higher surface areas in excess of one square meter per gram, are preferred because it has been found that the effect on which the success of the subject method depends is essentially a surface phenomenon and larger surfaces are conducive to increased control of distribution of radiolysis products. Generally finely divided or high surface area unreactive solid substances such as metals, metal halides, sulfides, clays and inorganic substances of mineral origin as well as carbon in the form of activated charcoal or lamp black are satisfactory suspending media. For example, oxides of mineral origin have been found to be very effective in controlling the distribution of the products of the radiolysis of pentane. The control of the distribution of radiolysis products has been achieved with layers between approximately 0.1 and 10 monolayers, i.e., of the order of one monolayer. The optimum change in the distribution of radiolysis products occurs at approximately one monolayer.

The extent of radiolysis, i.e., the total amount of products of radiolysis formed, is not significantly changed over that produced by the bulk irradiation. It is rather a change in the distribution of the products, i.e., the relative concentrations of materials of different molecular weight and different isomeric configuration, which is achieved in practicing the subject invention. Doses of radiation in excess of 100,000 rads are useful in practicing the method of the subject invention.

The following examples are illustrative of the method of the present invention although it will be understood that the scope of the method does not limit it to these examples.

*Example 1*

A fixed volume of 10 cubic centimeters of solid powder was weighed into an irradiation cell. The solid was preconditioned before introduction into the cell by evacuation to a high vacuum in the order of $10^{-5}$ millimeters of mercury at a temperature of 300 to 450° C. for one hour or until no more water vapor was evolved. This was followed by a pre-irradiation of the solid in the cell under vacuum at a dose of $10^6$ roentgens of gamma rays. Pentane which had been thoroughly degassed by pumping while in a liquid nitrogen trap was distilled onto the powder at liquid nitrogen temperature. Quantities of pentane between 1 and 50% of the weight of the solid were employed. The irradiation cell which had a break-off seal was then sealed under vacuum.

Figure 1:
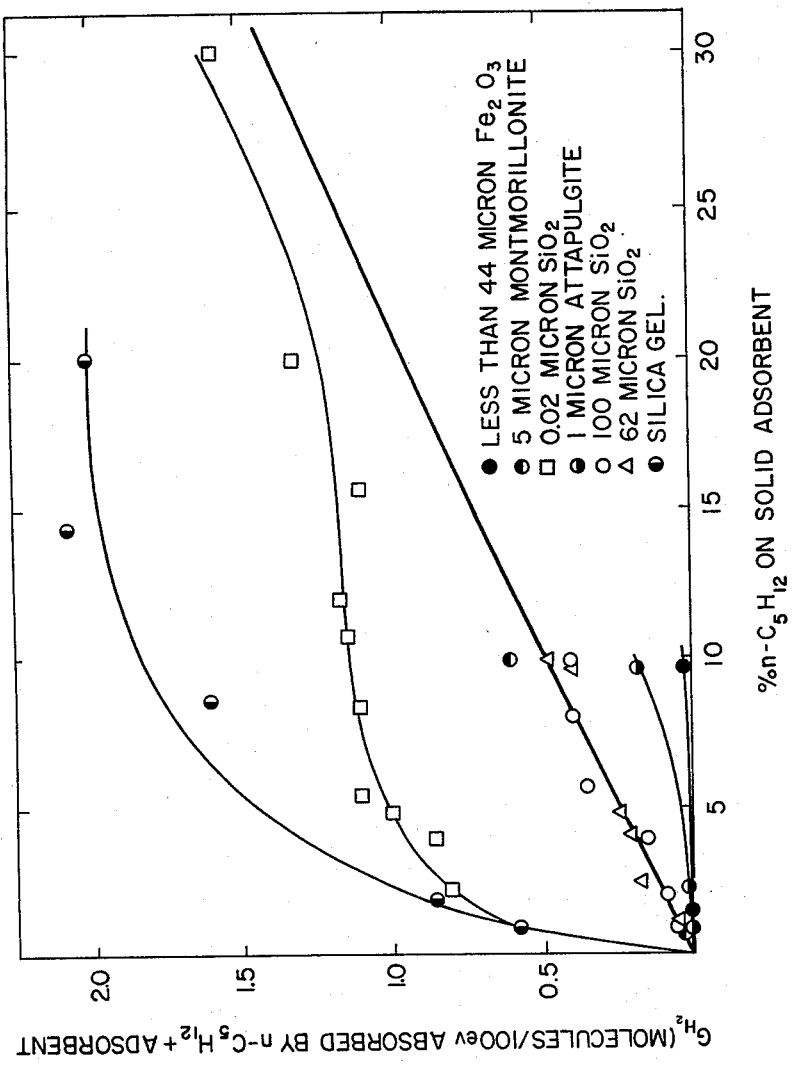
Figure 1 is a graph showing $G_{H_2}$ plotted against the percentage by weight of hydrocarbon in the mixture of hydrocarbons and solid.

The samples were then irradiated with cobalt 60 gamma rays at a dose rate of 269,000 roentgen per hour or 205,000 roentgen per hour. The total doses were $13.2 \times 10^6$ roentgen or $39.0 \times 10^6$ roentgen based on $FeSO_4$ dosimetry as set forth in Proceedings of the First International Conference on the Peaceful Uses of Atomic Energy, Geneva (1955), volume 14, page 179. After irradiation the samples were opened into a vacuum system, the entire volatile contents of the irradiation tube were transferred through a trap and cooled in liquid nitrogen. The hydrocarbons higher than methane in molecular weight were collected in the liquid nitrogen trap. The gases passing through the trap were measured in a McLeod gauge and were then passed to a Saunders-Taylor combustion analysis apparatus. Percentages of hydrogen and methane were determined in this latter apparatus. The results obtained in accordance with this example insofar as a modification of the $G_{H_2}$ was obtained, are shown in Figure 1, which is a plot of the hydrogen yield ($G_{H_2}$ in molecules per 100 electron volts taken up by normal $C_5H_{12}$ plus adsorbent) against the weight percent of normal $C_5H_{12}$. In the adsorbent-pentane mixture the legend for the solid adsorbents employed is given on the figure. The $G_{H_2}$ for 10 weight percent pentane on 44 micron $Fe_2O_3$ is 0.0045, although its value may appear to be somewhat higher from the plot on the figure. The straight line represents the plot of the $G_{H_2}$ against the weight percent of normal pentane on the solid absorbent for bulk irradiation. It is apparent from this example that as the surface area or state of subdivision of the solid adsorbent is increased the modification of the distribution of radiolysis products is also changed. Thus the $G_{H_2}$ obtained for 100 micron silicon dioxide and 62 micron silicon dioxide is relatively close to that obtained for the radiation of bulk material, whereas when this value is changed by a factor in the order of a few thousand, the $G_{H_2}$ is significantly increased for the same solid adsorbent. It is also apparent that an optimum change occurs at about 4 to 5 volume percent of normal pentane on the adsorbent and this value corresponds to approximately one monolayer. By forming a layer of normal pentane on either 0.02 micron silica or silica gel, radiolysis formation of hydrogen may be increased. The formation of hydrogen may be suppressed by irradiation of a layer of pentane on iron oxide and attapulgite.

The surface area of the 0.02 micron diameter silica was about 200 square meters per gram, the surface area of the ferric oxide, which passed a 325 mesh screen, was about 10 square meters per gram. The silica gel was 14 to 20 mesh product. One micron attapulgite was colloidal and had an approximate surface area of 100 square meters per gram.

Figure 2:
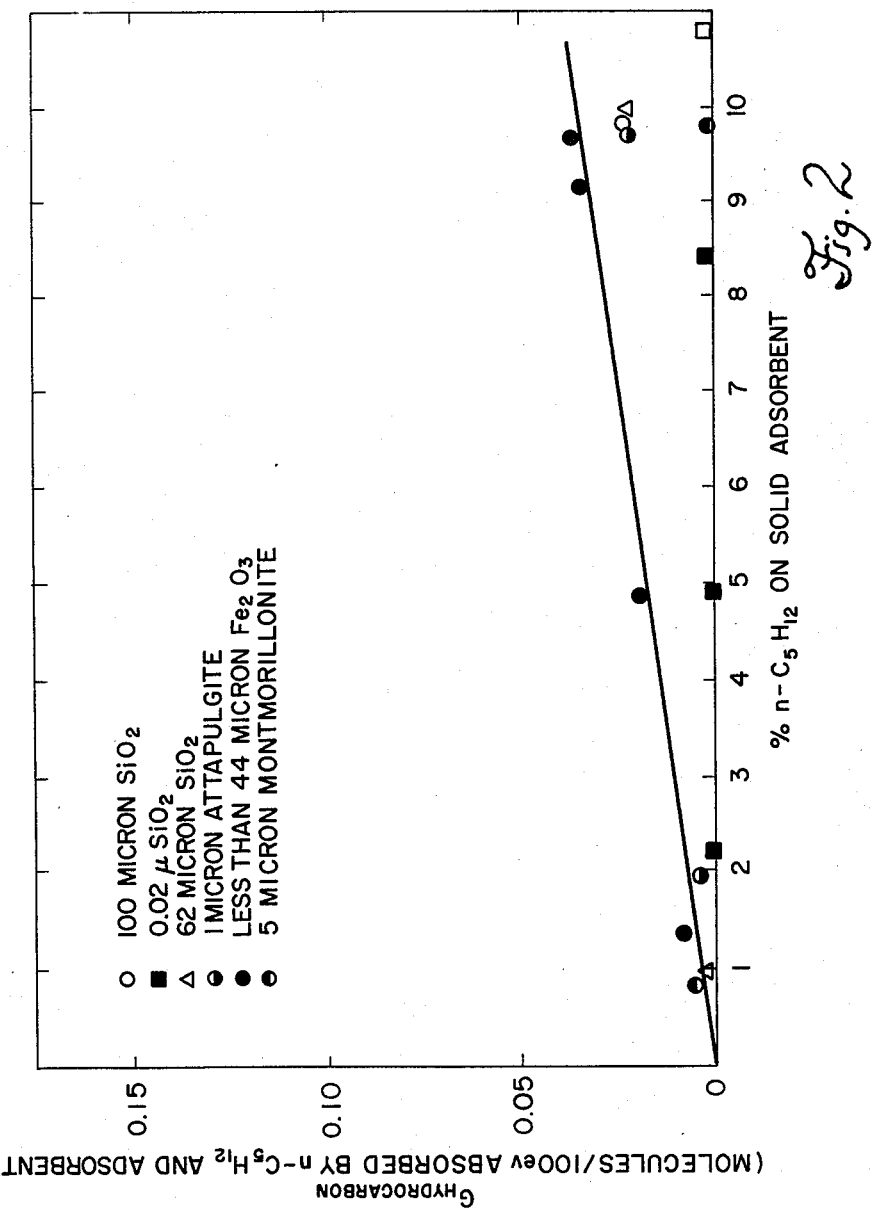
Figure 2 is a graph showing $G_{CH_4}$ plotted against the percentage of hydrocarbon in the mixture of hydrocarbons and solid.

The effects of these solids on the $G_{CH_4}$ are shown in Figure 2, where methane yield ($G_{hydrocarbon}$ equal to molecules of hydrocarbon fraction volatile at liquid nitrogen temperature per 100 electron volts adsorbed by the normal pentane plus adsorbent) is plotted against the weight percent of normal pentane in the solid adsorbent-pentane mixture. This hydrocarbon fraction consists of more than 95% methane. The heavy line represents the methane yield if the solid powder acted only as an inert diluent. The three solids, 100 micron silica, 62 micron silica and 1 micron attapulgite show little change from the $G_{hydrocarbon}$ for bulk irradiation. A definite suppression of methane formation was found with two solids, 0.02 micron silica and 5 micron montmorillonite. The use of iron oxide as a suspending medium resulted in a slight increase in methane formation. The effect of the various solids on the ratios of products heavier than methane is shown in Figure 3. This bar graph shows for each run the ratio of the chromatograph peak areas for the various lower fractions to the area of an isopentane peak which is arbitrarily taken as 100 for each run. The absolute G values for isopentane were obtained as 0.7 for the bulk liquid, 1.0 for pentane absorbed on 100 micron silica, 0.6 on 0.02 micron silica, 2.4 on ferric oxide and 1.4 on montmorillonite. These values are calculated on the basis of energy absorbed directly in the pentane. It is apparent that the radiation of hydrocarbons in the form of a thin film on a suspending solid results in a significant alteration in the distribution of radiolysis products. It is particularly noteworthy that an approximate 80-fold increase in the iso-$C_4$ fraction is caused by the formation of this layer on montmorillonite or ferric oxide. It has been determined that by the use of the subject method, the quantity of hydrogen produced by irradiation can be increased 100% and the quantity of lower hydrocarbons can be increased over 1100%, as compared to the quantity obtained by irradiating the same amount of hydrocarbon using the same radiation dosage in bulk form rather than in the form of a thin film.

*Example II*

A sample of 140 mesh silica was degassed at room temperature. The powder was weighed into an irradiation cell which had a vacuum breakoff seal. Pentane which was thoroughly degassed by pumping at liquid nitrogen temperature was distilled onto the powder which was also at liquid nitrogen temperature. The irradiation cell was then sealed off under vacuum. The sample was irradiated with cobalt 60 gamma rays at a dose rate of 27,000 roentgen per hour or a total dose of $4.5 \times 10^5$ roentgen based on FeSO$_4$ dosimetry. Analysis of the irradiated sample revealed that based on energy absorbed in the hydrocarbon the $G_{H_2}$ was 12.1, the $G_{CH_4}$ was 4.5 and the $G_{C_2}$ was 2.35. The gases which were evolved were found to contain 60.4% hydrogen, 0.7% CO, 24.2% $C_1$ hydrocarbon and 14.7% $C_2$ hydrocarbon.

*Example III*

An experiment parallel to the above was run. A sample of 140 mesh silica was degassed at 300° C. in an evacuated irradiation cell having a vacuum break-off seal. The sample was irradiated as indicated in Exmple II to receive a dose of $4.5 \times 10^5$ roentgen. The composition of the gases evolved was as follows: 95% hydrogen, 0.0% CO, 4.4% $C_1$ and $C_2$ hydrocarbons. The $G_{H_2}$ was found to be 6.2 and the $G_{hydrocarbons}$ was 0.29.

The difference in the results obtained in Example III as compared with Example II is attributed to the presence of small amounts of oxygen or water due to the incomplete degassing carried out in the first example.

*Example IV*

A sample of acid treated, white, medicinal grade mineral oil was partially degassed. The sample was subjected to irradiation substantially as described in Example II. The $G_{H_2}$ was found to be 0.565, the $G_{(CO)}$ was found to be 0.885 and the $G_{hydrocarbons}$ ($C_1$-$C_5$) were found to be 2.44. Of the gas that was formed 12.5 volume percent was found to be hydrogen, 19.7% was CO and 54.5% was hydrocarbons in the range $C_1$ to $C_5$. The sample absorbed $27.6 \times 10^{19}$ electron volts of energy.

*Example V*

Substantially the same experiment as that above was run on a thoroughly degassed sample. The $G_{H_2}$ of this example was 3.7, the $G_{hydrocarbons}$ was 0.20. The sample absorbed $3.88 \times 10^{19}$ electron volts of energy. The gas was found to contain 95% hydrogen, 0.0% CO, and 4% hydrocarbons. Again the difference in results obtained in this example as compared with the results of Example IV are found to occur because of the incomplete degassing. This is deemed to be due to the effect of adsorbed oxygen. There is a ten-fold increase in hydrocarbon formation resulting from this difference in the presence of oxygen.

Since many embodiments might be made in the present invention and since many changes might be made in the embodiments described, it is to be understood that the foregoing description is to be interpreted as illustrative only and not in a limiting sense.

We claim:

1. The method of altering the ratios in which the radiolysis products of different molecular weight are formed by irradiation of an alkane hydrocarbon compound, having a low boiling point, in bulk form which comprises forming a layer of compound having a thickness of from 0.1 to 10 monolayers on the surface of a solid substance which is unreactive and insoluble in the alkane hydrocarbon compound under the conditions of irradiation, said substance having a surface area in excess of one square meter per gram, irradiating said substance and layer with gamma radiation at a dose of more than 100,000 rads, and separating the organic substance from the solid.

2. The method of altering the ratio of production of branched hydrocarbons to normal hydrocarbons as compared to the ratio produced in the irradiation of bulk material which comprises depositing an alkane hydrocarbon, having a low boiling point, in the form of a thin layer of from 0.1 to 10 monolayers on the surface of a solid substance having a surface area of at least one square meter per gram, said substance being unreactive with and insoluble in said hydrocarbon under the conditions of irradiation, irradiating the hydrocarbon with gamma radiation at a dose of at least 100,000 rads, and separating the hydrocarbons from said solid substance.

3. The method of controlling yields of radiolysis products produced by irradiation of pentane which comprises forming a layer of from 0.1 to 10 monolayers of a compound to be irradiated on a solid having a surface area in excess of one square meter per gram, said solid being unreactive with said compound under the conditions of irradiation, irradiating said layer with gamma radiation to a dose of more than 100,000 rads and separating said layer from said solid.

4. A method of converting pentane to a branched chain product which comprises depositing said alkane hydrocarbon as a thin film, from 0.1 to 10 monolayers, on the solid surface of a solid which is unreactive with and insoluble in said pentane under the processing conditions, said solid having a surface area in excess of one square meter per gram, irradiating said hydrocarbon with at least 100,000 rads of gamma radiation, and thereafter separating the branched chain product produced thereby.

5. The method of claim 2 wherein the solid is selected from the group consisting of metals, metal salts, metal oxides and carbon.

References Cited in the file of this patent

UNITED STATES PATENTS

| | | |
|---|---|---|
| 1,253,793 | Dedichen et al. | Jan. 15, 1918 |
| 2,353,899 | Ipatieff et al. | July 18, 1944 |
| 2,392,798 | Kleiss | Jan. 8, 1946 |
| 2,524,862 | White | Oct. 10, 1950 |
| 2,743,223 | McClinton | Apr. 24, 1956 |
| 2,859,171 | Fahnestock et al. | Nov. 4, 1958 |

OTHER REFERENCES

Ellis et al.: "Chemical Action of Ultraviolet Rays," p. 265.

Berkman et al.: "Catalysis," pp. 988 and 989.

Egloff et al.: "Isomerism of Pure Hydrocarbons," pp. 31 and 32.